United States Patent
Kneen et al.

(10) Patent No.: US 12,423,744 B2
(45) Date of Patent: Sep. 23, 2025

(54) DYNAMICALLY UPDATED LISTING USER INTERFACE

(71) Applicant: eBay Inc., San Jose, CA (US)

(72) Inventors: Ben Kneen, Boston, MA (US); Giridhar Kumaran, Bothell, WA (US); Arun Lakshminarayanan, San Jose, CA (US); Jeremy Engle, San Jose, CA (US); Gurudatta Horantur Shivaswamy, Saratoga, CA (US); Lien Ekdahl, Alviso, CA (US)

(73) Assignee: EBAY INC., San Jose, CA (US)

( * ) Notice: Subject to any disclaimer, the term of this patent is extended or adjusted under 35 U.S.C. 154(b) by 149 days.

(21) Appl. No.: 18/206,878

(22) Filed: Jun. 7, 2023

(65) Prior Publication Data

US 2023/0316390 A1    Oct. 5, 2023

Related U.S. Application Data

(63) Continuation of application No. 16/805,067, filed on Feb. 28, 2020, now Pat. No. 11,704,724, which is a continuation of application No. 14/142,517, filed on Dec. 27, 2013, now Pat. No. 10,607,281.

(51) Int. Cl.
| | | |
|---|---|---|
| *G06Q 40/00* | (2023.01) | |
| *G06Q 30/00* | (2023.01) | |
| *G06Q 30/02* | (2023.01) | |
| *G06Q 30/08* | (2012.01) | |

(52) U.S. Cl.
CPC ............ *G06Q 30/08* (2013.01); *G06Q 30/02* (2013.01)

(58) Field of Classification Search
CPC ................................ G06Q 30/08; G06Q 30/02
See application file for complete search history.

(56) References Cited

U.S. PATENT DOCUMENTS

| | | |
|---|---|---|
| 6,044,363 A | 3/2000 | Mori et al. |
| 10,607,281 B2 | 3/2020 | Kneen et al. |
| 11,704,724 B2 | 7/2023 | Kneen et al. |

(Continued)

FOREIGN PATENT DOCUMENTS

| | | |
|---|---|---|
| WO | 2004114083 | 12/2004 |
| WO | 2015100247 | 7/2015 |

OTHER PUBLICATIONS

U.S. Appl. No. 14/142,517 U.S. Pat. No. 10,607,281, filed Dec. 27, 2013, Dynamically Updated Listing User Interface (As Amended).

(Continued)

*Primary Examiner* — Maroun P Kanaan
(74) *Attorney, Agent, or Firm* — SCHWEGMAN LUNDBERG & WOESSNER, P.A.

(57) ABSTRACT

In an example embodiment, an item characteristic is received, the item characteristic pertaining to an item being listed for sale, by a seller, via an ecommerce service. Then, a plurality of past transactions of items having the item characteristic are analyzed. Based on this analysis, a first set of one or more optimal listing configuration parameters are identified in accordance with a first set of listing criteria. Then, the first set of one or more identified optimal listing configuration parameters to the seller in a user interface that permits the seller to change one or more listing configuration parameters based on the presentation.

16 Claims, 12 Drawing Sheets

(56) References Cited

U.S. PATENT DOCUMENTS

| | | | |
|---|---|---|---|
| 2003/0229552 A1 | 12/2003 | Lebaric et al. | |
| 2005/0071249 A1 | 3/2005 | Nix et al. | |
| 2005/0278243 A1* | 12/2005 | Ghani | G06Q 30/08 705/37 |
| 2007/0130090 A1 | 6/2007 | Staib et al. | |
| 2007/0203824 A1 | 8/2007 | Whelchel et al. | |
| 2008/0027880 A1* | 1/2008 | Yu | G06Q 40/06 705/36 R |
| 2011/0231228 A1 | 9/2011 | Chatter et al. | |
| 2011/0264505 A1 | 10/2011 | Turner-rielle | |
| 2014/0279163 A1* | 9/2014 | Gladis | G06Q 30/0202 705/26.3 |
| 2015/0186989 A1 | 7/2015 | Kneen et al. | |
| 2020/0202421 A1 | 6/2020 | Kneen et al. | |

OTHER PUBLICATIONS

U.S. Appl. No. 16/805,067 U.S. Pat. No. 11,704,724, filed Feb. 28, 2020, Dynamically Updated Listing User Interface (As Amended).
"International Application Serial No. PCT US2014 071915, International Search Report mailed Mar. 18, 2015", 2 pgs.
"International Application Serial No. PCT US2014 071915, Written Opinion mailed Mar. 18, 2015", 4 pgs.
"U.S. Appl. No. 14/142,517, Non Final Office Action mailed Jul. 1, 2016", 14 pgs.
"International Application Serial No. PCT US2014 071915, International Preliminary Report on Patentability mailed Jul. 7, 2016", 6 pgs.
"U.S. Appl. No. 14/142,517, Examiner Interview Summary mailed Oct. 26, 2016", 3 pgs.
"U.S. Appl. No. 14/142,517, Final Office Action mailed Feb. 17, 2017", 18 pgs.
"U.S. Appl. No. 14/142,517, Examiner Interview Summary mailed Apr. 12, 2017", 3 pgs.
"U.S. Appl. No. 14/142,517, Non Final Office Action mailed Dec. 8, 2017", 9 pgs.
"U.S. Appl. No. 14/142,517, Final Office Action mailed Jul. 2, 2018", 8 pgs.
"U.S. Appl. No. 14/142,517, Non Final Office Action mailed Mar. 21, 2019", 9 pgs.
"U.S. Appl. No. 14/142,517, Notice of Allowance mailed Nov. 21, 2019", 5 pgs.
"U.S. Appl. No. 14/142,517, Corrected Notice of Allowability mailed Jan. 22, 2020", 4 pgs.
"U.S. Appl. No. 16/805,067, Non Final Office Action mailed Nov. 25, 2022", 9 pgs.
"U.S. Appl. No. 16/805,067, Examiner Interview Summary mailed Feb. 24, 2023", 2 pgs.
"U.S. Appl. No. 16/805,067, Notice of Allowance mailed Mar. 1, 2023", 5 pgs.

* cited by examiner

DYNAMICALLY UPDATED LISTING USER INTERFACE

CROSS REFERENCE TO RELATED APPLICATIONS

This application is a continuation of and claims priority to U.S. patent application Ser. No. 16/805,067, filed Feb. 28, 2020, which is a continuation of and claims priority to U.S. patent application Ser. No. 14/142,517, filed Dec. 27, 2013, each of which is hereby incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to electronic commerce and, in one specific example, to a pricing and listing configuration recommendation engine.

BACKGROUND

Ecommerce transactions, such as online sales and auctions, have now surpassed traditional consumer transactions in total revenue. Typically, ecommerce transactions begin with a seller creating a listing, which includes an offer to sell or auction the item. The listing is created using one or more configuration parameters. For example, in the case of an online auction, a seller may be able to specify reserve price, starting bid, time of auction end, number of photos attached to listing, whether free shipping is offered, promotional placement, and other configuration parameters.

BRIEF DESCRIPTION OF THE DRAWINGS

Some embodiments are illustrated by way of example and not limitation in the figures of the accompanying drawings in which.

DETAILED DESCRIPTION

Example methods and systems for text translation in ecommerce services are provided. It will be evident, however, to one skilled in the art that the present inventive subject matter may be practiced without these specific details.

According to various exemplary embodiments, historical usage and sales information regarding ecommerce transactions is used to make recommendations to sellers as to one or more configuration settings. In this way, sellers can improve their changes of obtaining high sales volumes and/or maximizing sales prices.

Figure 1:
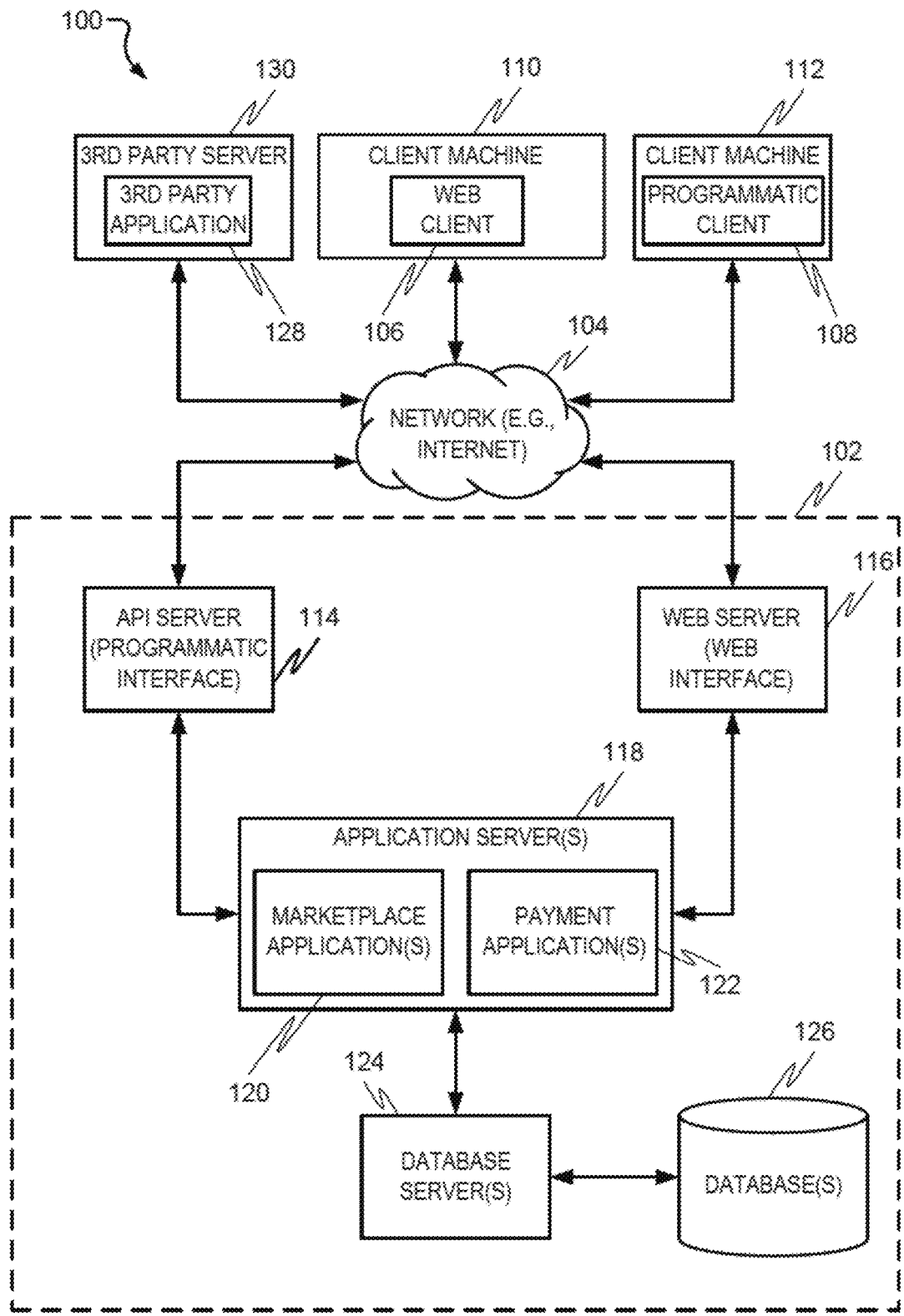
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Washington State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, California) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
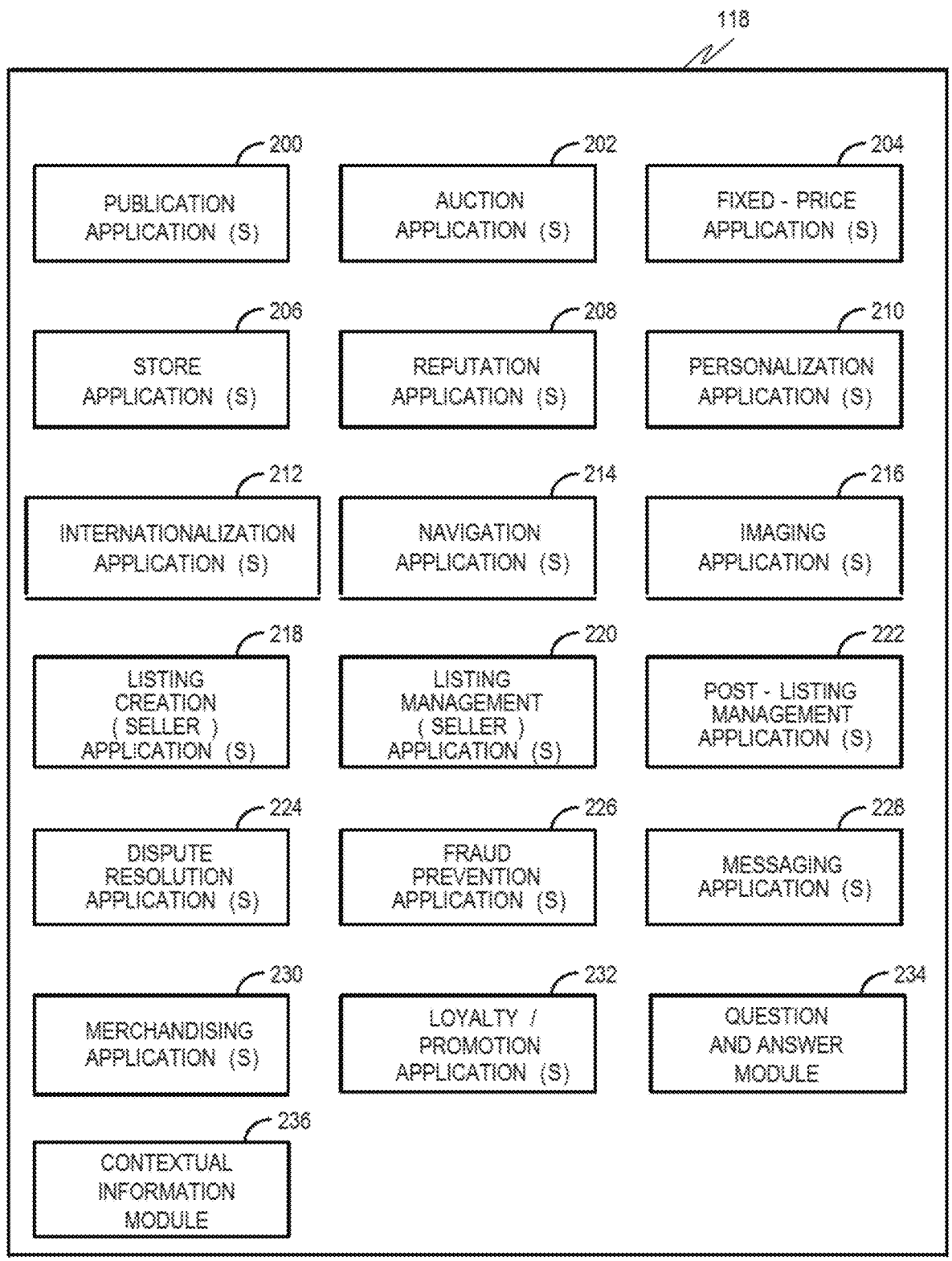
FIG. 2 is a block diagram illustrating marketplace and payment applications and that, in one example embodiment, are provided as part of application server(s) 118 in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
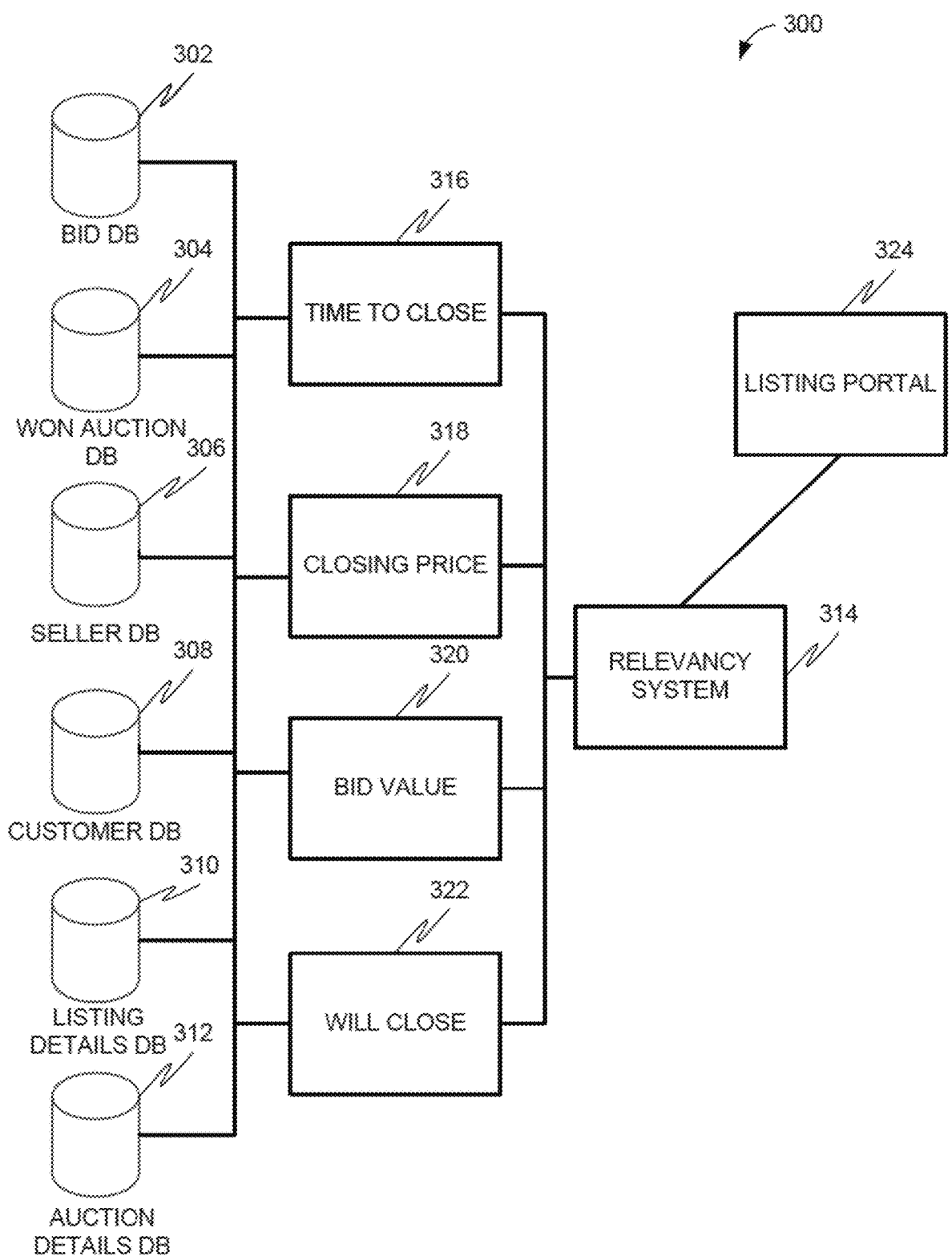
FIG. 3 is a block diagram illustrating a system of auction listing recommendation in accordance with an example embodiment.

FIG. 3 is a block diagram illustrating a system 300 of auction listing recommendation in accordance with an example embodiment. The system 300 may include a bid database 302, a won auction database 304, a seller database 306, a customer database 308, a listing details database 310, and an auction details database 312. It should be noted that while these databases 302-312 are depicted as distinct databases, in some example embodiments they are all contained in a single physical or logical database.

The bid database 302 may contain information about bids placed on auctions, including, for example, listing identification, customer identification, timestamp, and amount. The won auction database 304 may contain information about auctions that have been won, including, for example, customer identification, listing identification, seller identification, amount, and timestamp.

The seller database 306 may contain information about sellers, including, for example, seller identification, seller reputation, seller historical transactions, seller location, etc. The customer database 308 may contain information about customers, including, for example, customer identification, customer reputation, customer historical transactions, customer location, etc.

The listing details database 310 may contain details about particular listings, including, for example, seller identification, listing identification, listing price, listing type, auction versus fixed price, starting price, buy it now enabled, end date, scheduled end date, final price, shipping details, etc.

The auction details database 312 may contain general information about past auction details, such as, for example, seller identification, listing identification, customer identification, and bid identification.

It should be noted that the term "Auction" as used herein shall be interpreted broadly to encompass listings where the buyer may close the transaction by making a single bid, also known as a buy-it-now price. Additionally, the term should also be interpreted broadly to cover fixed-price auctions, where a set price is provided for goods and multiple bids are not accepted (e.g., buyers simply purchase or not purchase the item at a set price).

A relevancy system 314 may model the propensity to close for a particular auction based on historical listing details, historical bidding activity, bidding density based on various parameters (e.g., starting price, buy it now enabled), closing price based on various parameters (e.g., starting price) and estimate time to close. The relevancy system may create a multi-variate regression model to use on future listings. The relevancy system 314 may access various submodules 316-322 to aid in performing this modeling.

A closing price submodule 316 may estimate closing price based on auctions and bid activity on those listings in similar subcategories, or on specific products when that information is available (such as through Universal Product Code (UPC) or Stock Keeping Unit (SKU) codes).

A bid value submodule 318 may estimate the propensity to attract bids, and what bids will be, based on historical bid logs for listings in similar subcategories, or on specific products when that information is available.

A will close submodule 320 may estimate the propensity that the auction will sell based on past auctions and bid activity in those auctions in similar subcategories, or on specific products when that information is available.

A time to close submodule 322 may estimate the time to close based on past auctions and bid activity in those auctions in similar subcategories, or on specific products when that information is available.

The relevancy system 314 may output one or more recommendations to a listing portal 324, which may display the one or more recommendations when a seller is creating a listing.

An ecommerce listing may be any offer for sale of a product or service on an ecommerce web site or through an ecommerce service. This may include, for example, an auction listing, or a "buy it now" listing, but also could include a more traditional product sale page such as a web page devoted to a product sold by a particular retailer through the retailer's web page or service.

As an example, if a new smartphone sells for an average price of $150 across many auctions, and auctions that end between 2 AM and 6 AM EST tend to underperform the average by 20%, while auctions that end between 8 PM and 11 PM EST tend to outperform the average by 20%, then the system can recommend that sellers configure their listings of this smartphone to end between 8 PM and 11 PM EST for an estimate $30 increase in sale price.

As another example, if a new smartphone sells for an average price of $150 across many auctions, but those with a promotional listing outperform the average by 20% and only cost the seller $5 extra, then the net benefit to the seller to purchase that promotional listing is $25. The system can recommend that particular promotional listing product to the seller, an estimate its value.

It should be noted that the recommendations may not be provided just to sellers, but also may be made to potential buyers as well. For example, buyers can be alerted to specific listings that are priced below the average. This information may be presented in a number of different ways, including email or text alerts, or an icon or notification presented next to a listing on a screen of listings, the icon or notification saying "under market price" or "good deal" or the like.

While a number of different listing configuration parameters that the system can use to make recommendations have been described above, one of ordinary skill in the art will recognize that there are other factors that may be used. The following is intended to be a non-exhaustive list of potential listing configuration parameters:

1. Product Condition
2. Time of Auction Expiration
3. Presence of Photo
4. Number of Photos
5. Quality of Photos
6. Reserve Price Set
7. Reserve Price Amount
8. Shipping Price
9. Assigned Category
10. Buy It Now Available
11. Buy It Now Differential to Starting Bid
12. Starting Bid Price
13. Location of Seller
14. Seller Reputation
15. Seller Historical Transactions
16. Promotional Listing Selected These configuration parameters can be used to estimate impact to a number of different auction variables, such as sales price, number of bids, time to sale, and probability of sale.

Figure 4:
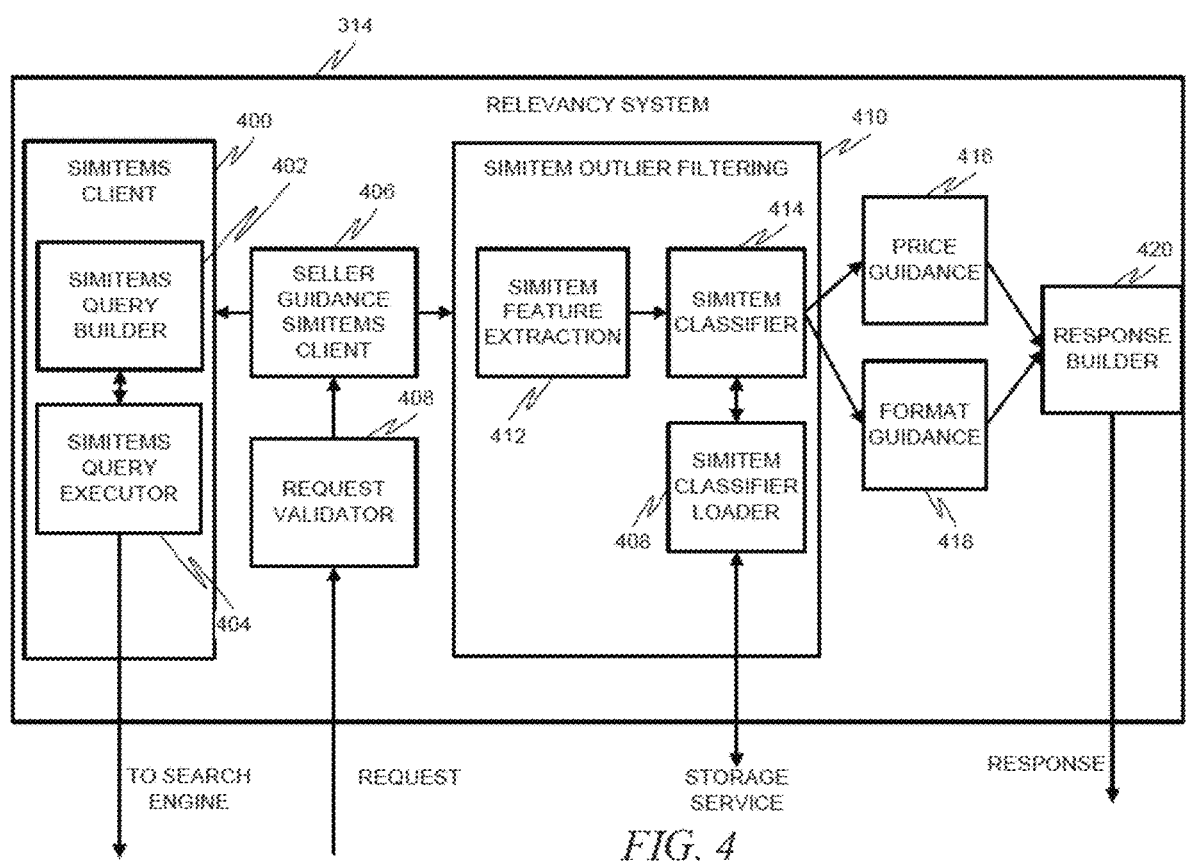
FIG. 4 is a block diagram illustrating a relevancy system in more detail, in accordance with an example embodiment.

In an example embodiment, item title, condition, category, aspects, seller identification and seller segment (e.g., consumer to consumer or business to consumer) are utilized to make recommendations based on historical similar items that were sold on in the ecommerce service. FIG. 4 is a block diagram illustrating a relevancy system, such as relevancy system 314 from FIG. 3, in more detail, in accordance with an example embodiment. A similar items ("simitems") client 400 may take an input item and query a search engine to find items that are similar, ranked by, for example, title similarity. The simitems client 400 may include a simitems query builder 402, which may build a query based on such information as item title, condition, category, and seller segment, and a simitems query executor 404, which may take the built query and use it to query a search engine, such as a search engine tied to the ecommerce service.

In an example embodiment, the query itself can be tuned via, for example, one or more tuning knobs presented in a user interface to administrators, which allows an administrator to vary the tightness of the query.

A seller guidance simitems client 406 may oversee the various aspects of the relevancy system, including receiving a request from a request validator 408 and passing the request, which includes an identification of an item, to the simitems client 400.

The retrieved items from the result of the query being sent to the search engine may be passed to the simitem outlier filtering 410. By reducing outlier similar items, the system is able to increase the precision of price guidance. The simitem outlier filtering 410 may be a module that is trained over time and maximize the precision of price guidance.

The simitem outlier filtering 410 may include simitem feature extraction 412, which may extract one or more features of the retrieved search engine results. The simitem outlier filtering 410 may also include a simitem classifier 414, which may predict whether the items returned from the search engine query are similar enough to the item in the original request, for the purpose of price calculation. In an example embodiment, the simitem classifier 414 may use a support vector machine (SVM) classifier. For feature sets, it may use title tokens, text similarity, category id, condition match, item cost, total cost (with shipping), watch count, bidder count, total views, and rank. The model may be trained offline based on completed items that sold. In an example embodiment, the model may be hosted in a storage service, with a cache to periodically refresh/load the model in memory. As such, any updates to the model can be automatically picked up by the service, via a simitem classifier loader 416.

While not pictured, at this point a price corrector may be use to correct for any price differentiation due to known factors, such as shipping cost. There are three main categories of items based on shipping: flat rate, free shipping, and calculated shipping. Typically the price of the free shipping items are slightly inflated to cover for the shipping costs to the seller. The price corrector can estimate what this inflation is and correct for it. Specifically, by looking at similar items with flat rate shipping, the system can compute what the percentage f the item cost is the typical shipping cost. The median such cost can be subtracted from the free shipping items cost to negate the inflation.

Price guidance 416 is then able to provide a price suggestion based on the results from the simitem classifier 414. Any number of different mechanisms can be used to derive the price. In an example embodiment, the median price of the top N similar items, as determined by the simitem classifier 414, is used.

Format guidance 418 may also be provided. One or more format metrics of similar items, perhaps the top N similar items as determined by the simitem classifier 414, may be use to recommend alterations of similar metrics in the seller listing.

In an example embodiment, price rounding may also be implemented. The result of price guidance based solely on a computed mean or median of the top N similar items may take the form of any valid real numbers (for example $13.78). In an example embodiment, these values may be rounded to a more psychologically acceptable value (for example, $13.99) that potentially results in greater adoption of the recommendation by sellers. The rounded price may have the flexibility to maximize over multiple metrics, such as conversion, average selling price, and popularity/frequency. After selecting the metric to optimize, the system may round within a certain dollar or cents threshold based on the original price. This allows an administrator to configured how aggressive he or she wants to be when rounding versus maximizing for prices for the given metric. The system may also only examine significant pricing points to remove noise.

As an example, a price recommendation service may return a figure of $24.57 and an administrator wishes to maximize conversion. Using this price, the system can look up the maximum and minimum range to round to. Since it is about $20 and less than $50, the threshold may be set to $1, so the system looks at all significant pricing points between $23.57 and $25.57. The system may find that $23.95, $23.99, $24, $24.50, $24.95, $24.99, $25, and $25.50 are significant points and out of this range the system looks up the conversion percentages for each price point and chooses the price with the maximum conversion.

Figure 5:
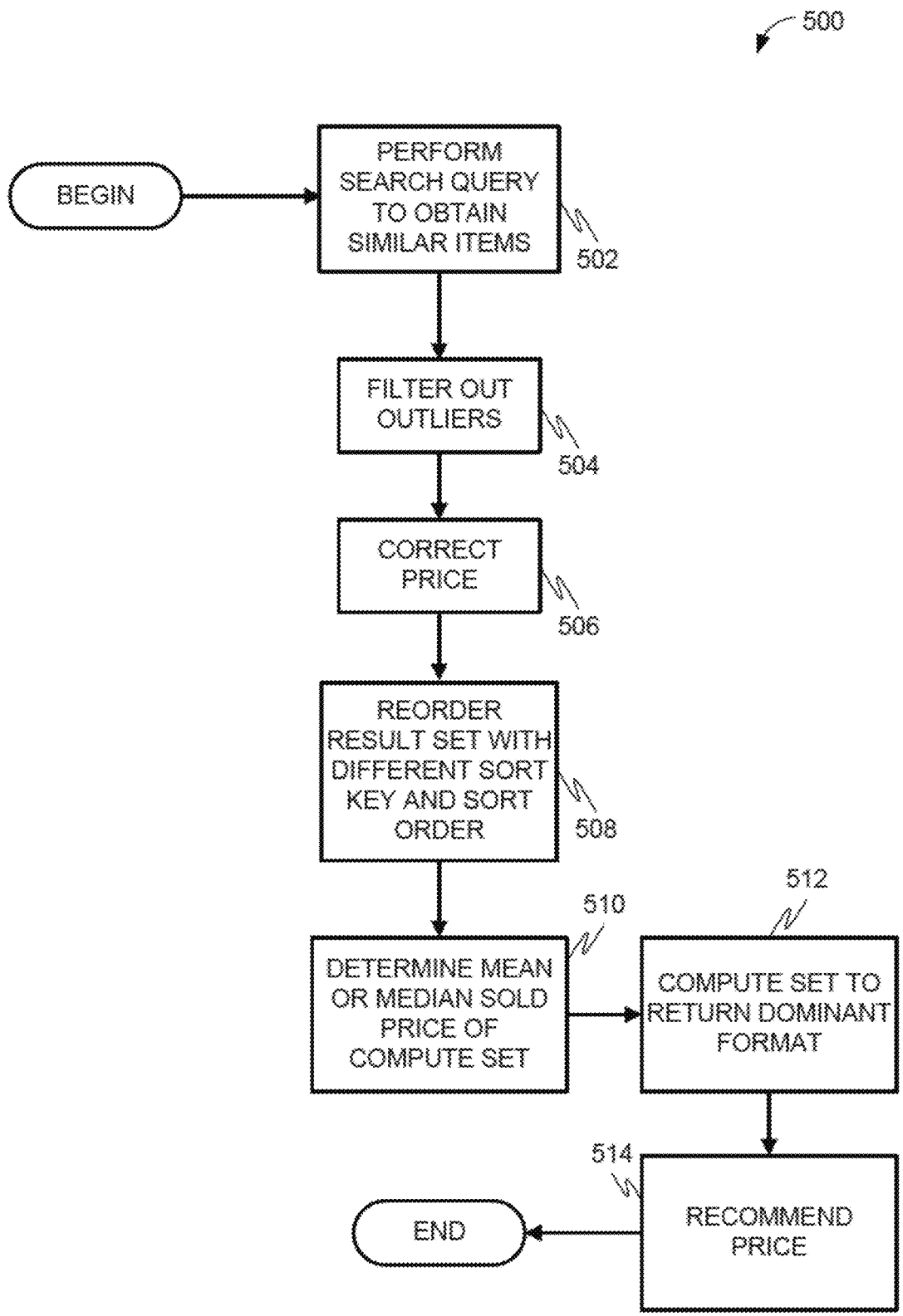
FIG. 5 is a flow diagram illustrating a method of making a recommendation for an ecommerce item listing in accordance with an example embodiment.

FIG. 5 is a flow diagram illustrating an example method 500 of making a recommendation for an ecommerce item listing in accordance with an example embodiment. In an example embodiment, the method 500 may be performed by the relevancy system 314 of FIG. 3

At operation 502, a search query may be performed on the ecommerce service to obtain similar items that were specifically sold, using one or more of the factors/parameters described above to influence or populate the query. This may be performed using any of a number of different possible flavors for the query with varying quorum thresholds. Examples include high inverse document frequency (IDF) and kand.

At operation 504, a similar item classifier may be used to filter out outliers that may skew the prediction. At operation 506, price correction may be applied to account for an inflated price on an item offering free shipping. At operation 508, the result set may be reordered with a different sort key and sort order and the top N items may be taken to form a price and format compute set. N may be defined by a price compute size. The sort key may be, for example, score, view item count watch count, time to sell, total cost, etc).

At operation 510, the mean or median sold price of the compute set is determined. At operation 512, a majority voting technique is applied to the compute set to return the dominant format. If there is no clear majority, the system may revert to a configured default.

At operation 514, in order to determine a recommended price, the top N auction items are taken and the media or mean start price is recommended.

Figure 6:
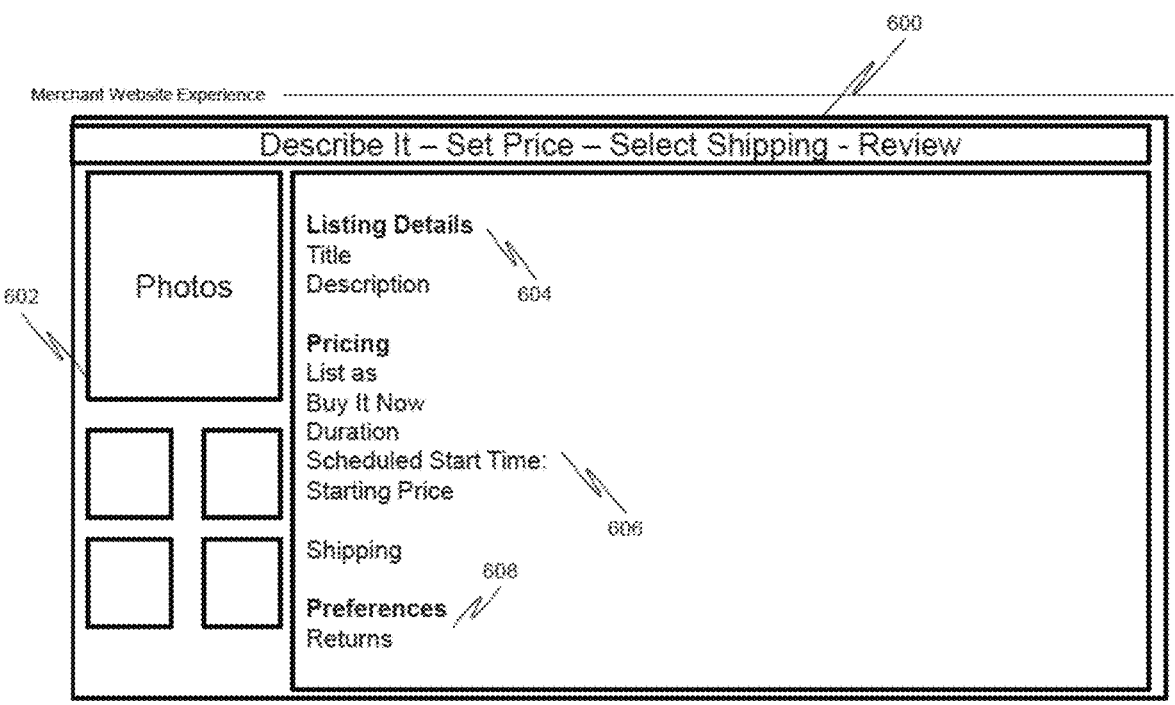
FIG. 6 is a screen capture illustrating the user interface as a user (seller) is ready to enter listing configuration parameters in accordance with an example embodiment.

FIGS. 6-9 are screen captures illustrating a user interface providing an ecommerce listing recommendation in accordance with an example embodiment. FIG. 6 is a screen capture illustrating the user interface 600 as a user (seller) is ready to enter listing configuration parameters in accordance with an example embodiment. The parameters include one or more photos 602, listing details 604 such as title and description, pricing details 606 such as list as, but it now, duration, scheduled start time, starting price, and shipping, and other preferences 608 such as whether returns are permitted.

Figure 7:
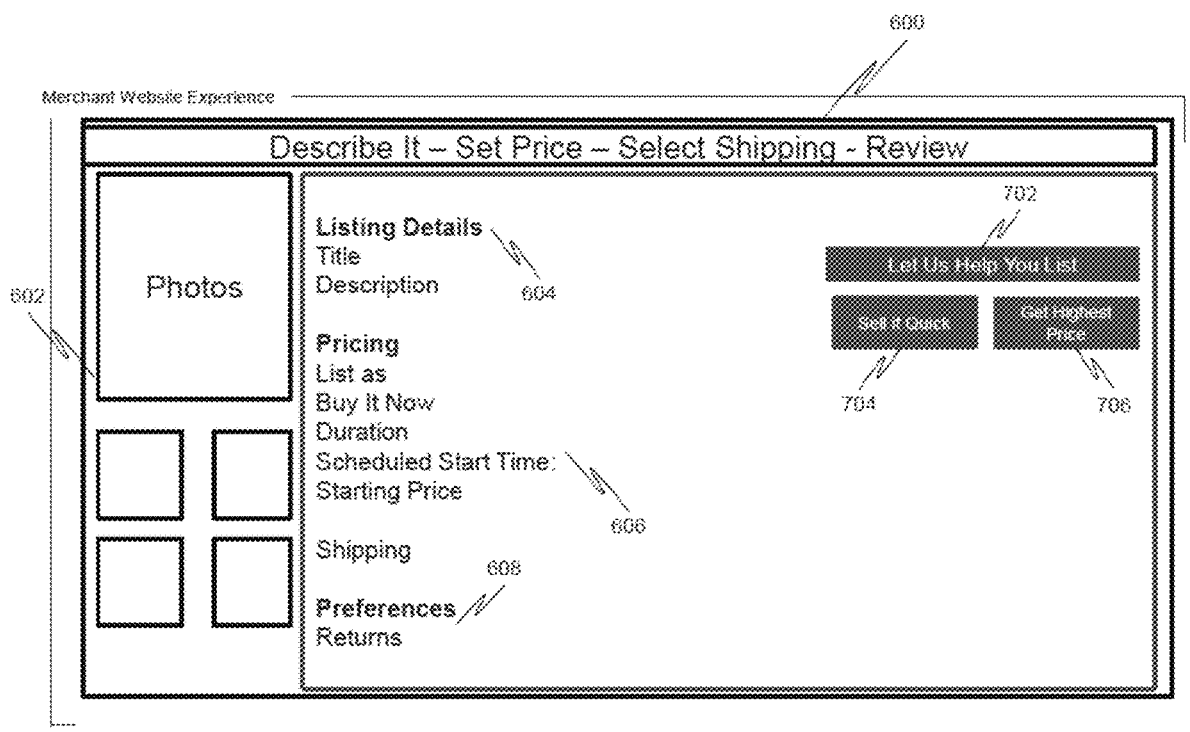
FIG. 7 is a screen capture illustrating the user interface with a preliminary recommendation option in accordance with an example embodiment.

FIG. 7 is a screen capture illustrating the user interface 600 with a preliminary recommendation option in accordance with an example embodiment. Here, the seller is presented with a "let us help you list" button 702. Pressing this button 702 may provide general recommendations for one or more of the listing parameters 602, 604, 606, 608. Additionally, more specific recommendations may be provided if the seller selects a "sell it quick" button 704 or a "get highest price" button 706. The "sell it quick" button 704 acts to provide recommendations geared towards ensuring that a product sells as quickly as possible. The "get highest price" button 706 acts to provide recommendations geared towards ensuring that a product sells for as high a price as possible. The seller is then able to choose what is more important to him or her: price or speed.

Figure 8:
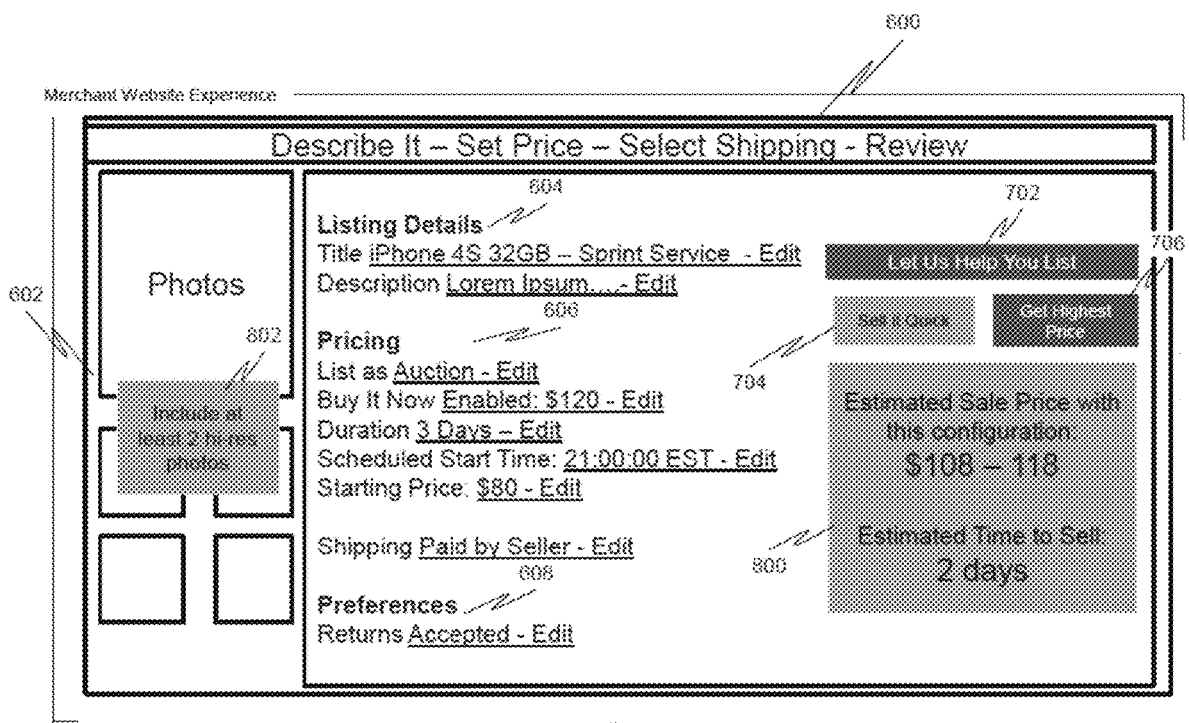
FIG. 8 is a screen capture illustrating the user interface with the seller having selected the "sell it quick" button in accordance with an example embodiment.

FIG. 8 is a screen capture illustrating the user interface 600 with the seller having selected the "sell it quick" button 704 in accordance with an example embodiment. In response to this action, a summary window 800 is displayed indicating an estimated sale price and time to sell with the configuration parameters specified. The various configuration parameters 604, 606, 608 have been completed. In an example embodiment, the system may fill out one or more of these parameters 604, 606, 608 on behalf of the user. In another example embodiment, these parameters 604, 606, 608 have been filled out by the seller and the seller uses the information in the summary window 800 to adjust one or more of the parameters 404, 406, 408.

Notably, here the system has estimated the sale price at $108-$118 and the estimated time to sell as 2 days.

In an example embodiment, the information in the summary window 800 may be dynamically updated as the seller changes one or more of the configuration parameters 602, 604, 606, 608. Thus, for example, if the user changes one of the pricing details 606, such as duration, the system may perform an analysis of estimated sale price and time to sell based on the new duration and update these values immediately in the summary window 800.

Additionally, a specific recommendation window 802 is provided, here recommending that the user include at least 2 high resolution photos, based on the recommendations from the system.

Figure 9:
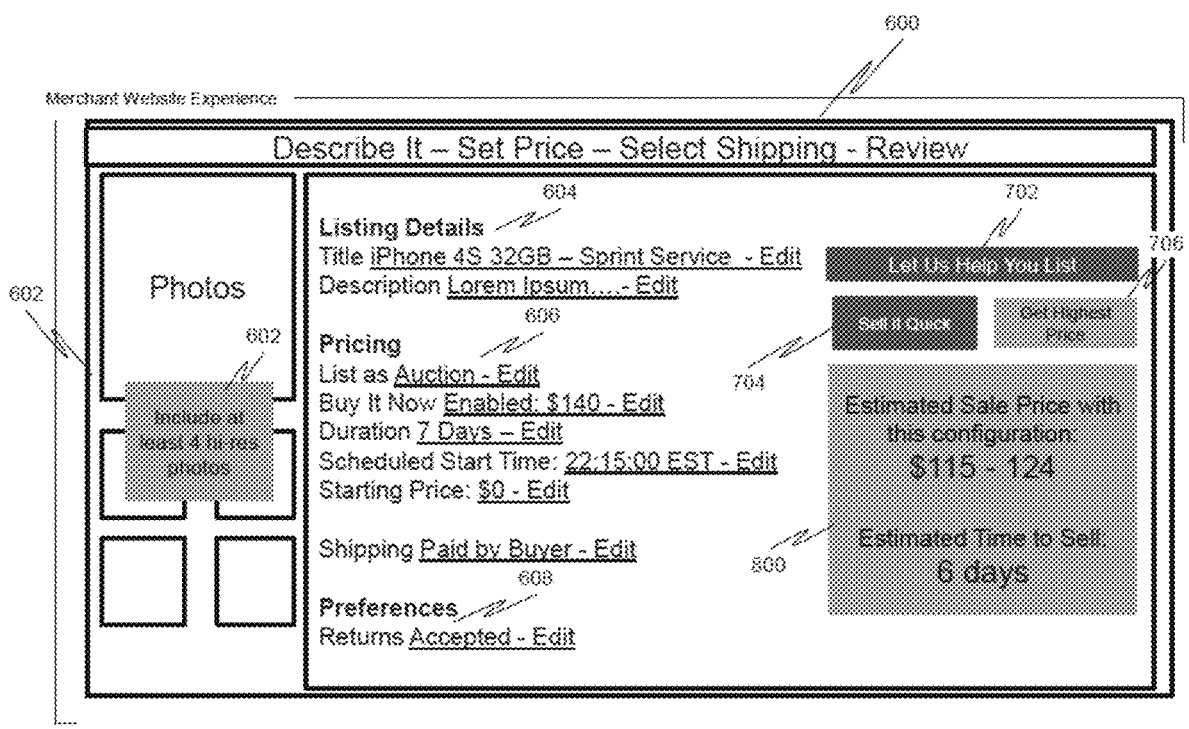
FIG. 9 is a screen capture illustrating the user interface with the seller having selected the "get highest price" button.

FIG. 9 is a screen capture illustrating the user interface 600 with the seller having selected the "get highest price" button 706. In response to this action, one or more of the configuration parameters 604, 606, 608 have changed from FIG. 8, which in turn has caused the information in the summary window 800 to change as well. Now the estimated sale price is $115-$124, which is higher than in FIG. 8, but the estimated time to sell is 6 days, which is longer than in FIG. 8.

Additionally, the specific recommendation window 802 has been updated to provide a recommendation in line with the desire to get the highest price. Here, the specific recommendation window 802 is recommending more photos than in FIG. 8.

Figure 10:
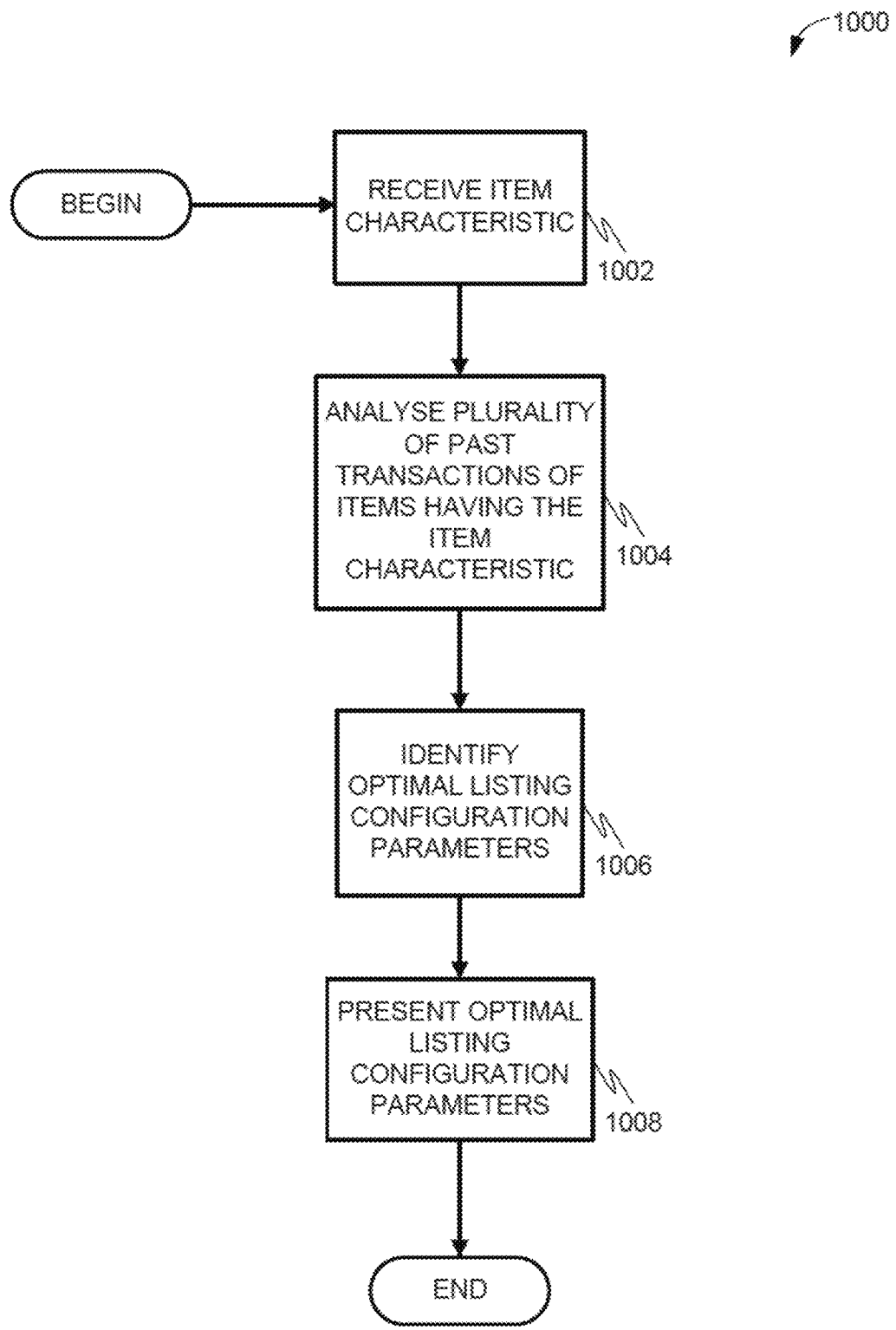
FIG. 10 is a flow diagram illustrating a method of providing optimal listing configuration parameters in an ecommerce listing in accordance with an example embodiment.

FIG. 10 is a flow diagram illustrating a method 1000 of providing optimal listing configuration parameters in an ecommerce listing in accordance with an example embodiment. At operation 1002, an item characteristic is received, the item characteristic pertaining to an item being listed for sale, by a seller, via an ecommerce service. At operation 1004, a plurality of past transactions of items having the item characteristic are analyzed. At operation 1006, based on the analysis of the plurality of past transactions, a first set of one or more optimal listing configuration parameters is identified in accordance with a first set of listing criteria. At operation 1008, the first set of one or more identified optimal listing configuration parameters is presented to the seller in a user interface that permits the seller to change one or more listing configuration parameters based on the presentation.

Example Mobile Device

Figure 11:
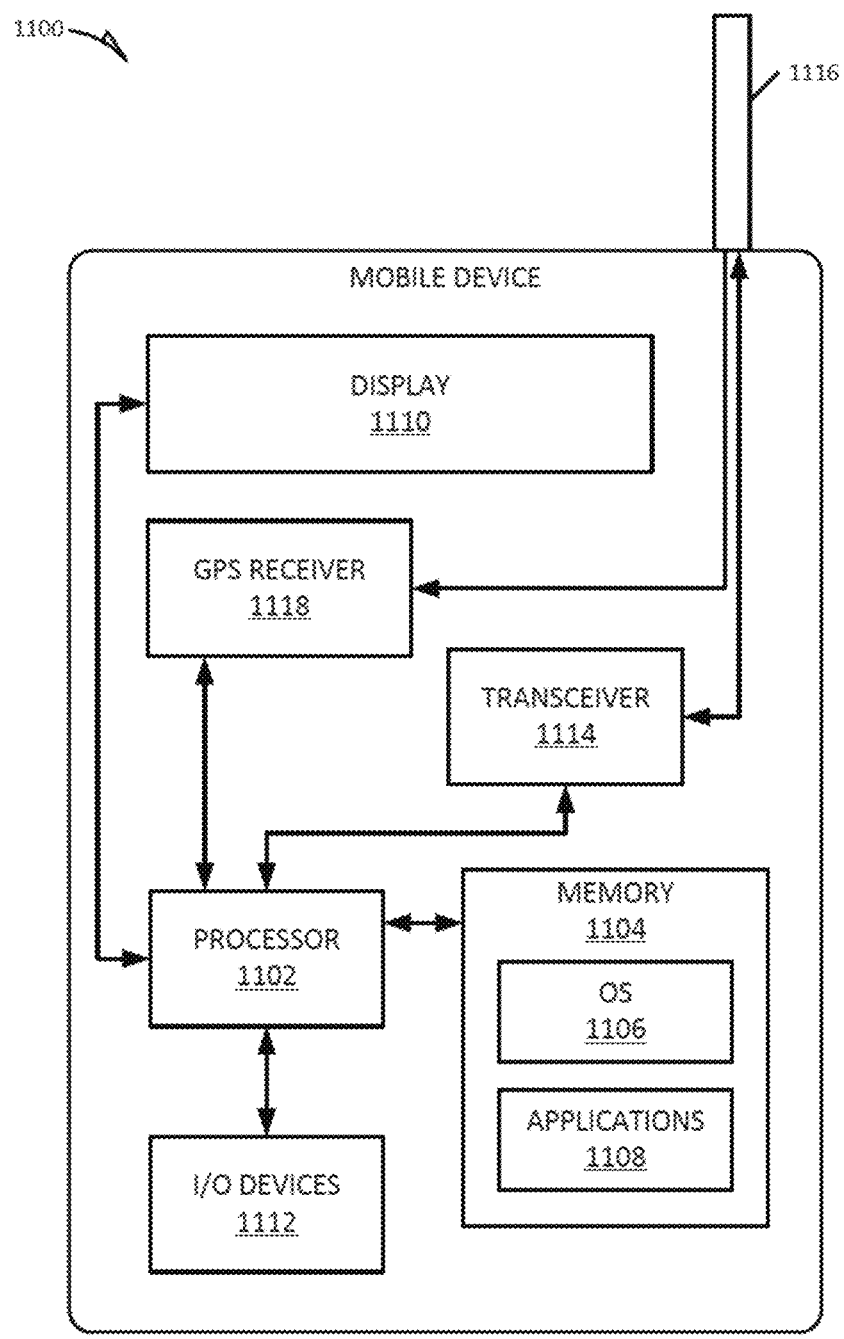
FIG. 11 is a block diagram illustrating a mobile device, according to an example embodiment.

FIG. 11 is a block diagram illustrating a mobile device 1100, according to an example embodiment. The mobile device 1000 may include a processor 1102. The processor 1102 may be any of a variety of different types of commercially available processors 1102 suitable for mobile devices 1100 (for example, an XScale architecture microprocessor, a microprocessor without interlocked pipeline stages (MIPS) architecture processor, or another type of processor 1102). A memory 1104, such as a random access memory (RAM), a flash memory, or other type of memory, is typically accessible to the processor 1102. The memory 1104 may be adapted to store an operating system (OS) 1106, as well as application programs 1108, such as a mobile location enabled application that may provide LBSs to a user. The processor 1102 may be coupled, either directly or via appropriate intermediary hardware, to a display 11010 and to one or more input/output (I/O) devices 1112, such as a keypad, a touch panel sensor, a microphone, and the like. Similarly, in some embodiments, the processor 1102 may be coupled to a transceiver 1114 that interfaces with an antenna 1116. The transceiver 1114 may be configured to both transmit and receive cellular network signals, wireless data signals, or other types of signals via the antenna 1116, depending on the nature of the mobile device 1100. Further, in some configurations, a GPS receiver 1118 may also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 1102 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 1102 or other programmable processor 1102) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1102 configured using software, the general-purpose processor 1102 may be configured as respective different hardware-implemented modules at different times. Software may accordingly configure a processor 1102, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors 1102 or processor-implemented modules. The performance of certain of the operations may be distributed among the one or more processors 1102, not only residing within a single machine, but deployed across a number of machines. In some example embodiments, the processor 1102 or processors 1102 may be located in a single location (e.g., within a home environment, an office environment or as a server farm), while in other embodiments the processors 1102 may be distributed across a number of locations.

The one or more processors 1102 may also operate to support performance of the relevant operations in a "cloud computing" environment or as a "software as a service"

(SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 1102, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 1102 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 1102), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
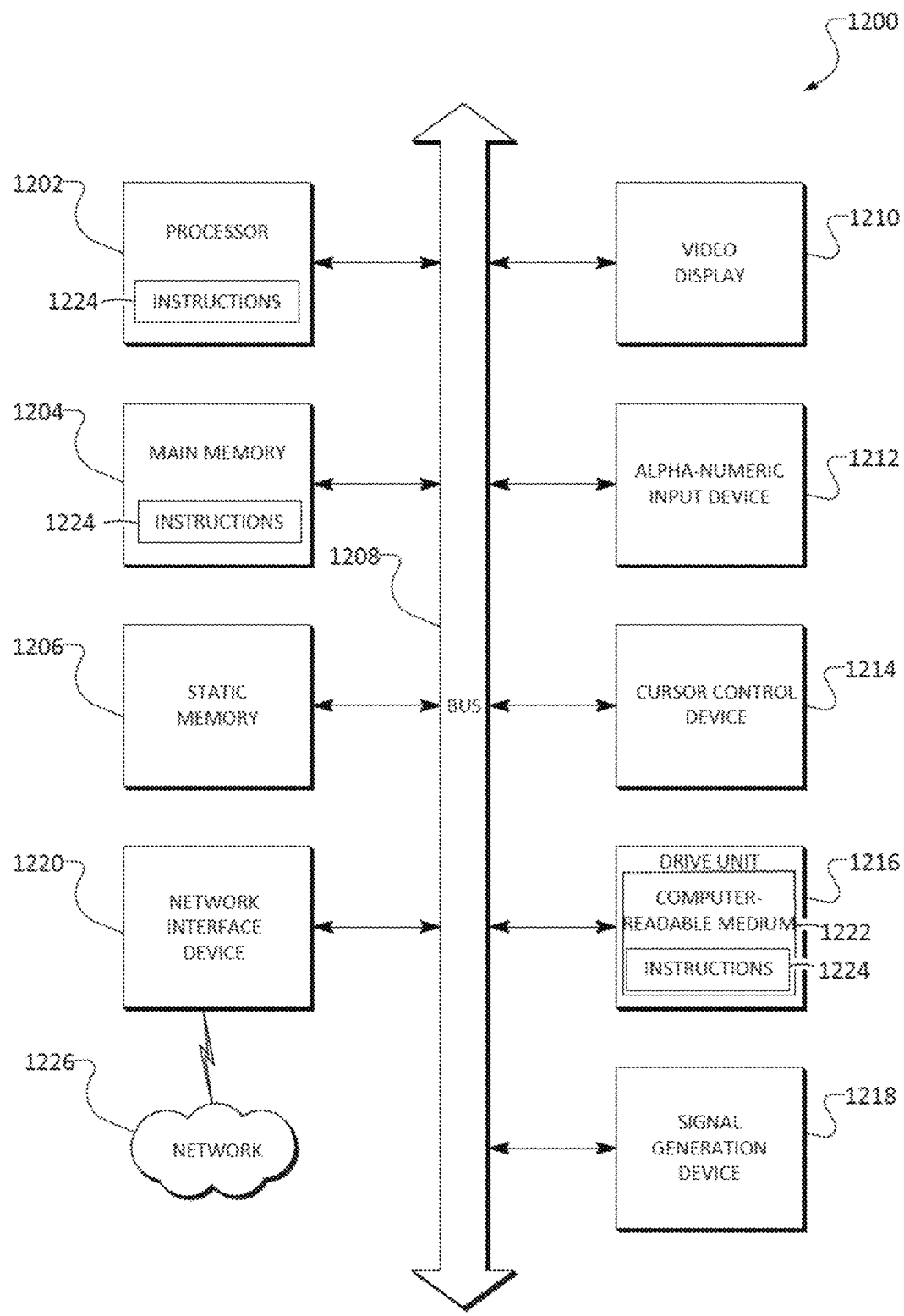
FIG. 12 is a block diagram of machine in the example form of a computer system within which instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions 1224 for execution by the machine and that cause the machine to perform any one or more of the methodologies of the present disclosure or that is capable of storing, encoding or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1224 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method comprising:
    causing display of a user interface comprising a plurality of data fields in which listing parameters of an item can be populated, the listing parameters being used to generate an item listing;
    receiving, via the user interface, a first user selection of a first recommendation icon displayed on the user interface;
    in response to receiving the first user selection:
        estimating a time to sell and a sales price range based on one or more characteristics of the item;
        determining at least one first listing parameter that corresponds to the estimated time to sell and sales price range, the at least one first listing parameter including one or more of a listing duration, a scheduled start time, a starting price, or a shipping parameter; and
        causing a dynamic update to the user interface to display the estimated time to sell, the sales price range, and
        the at least one first listing parameter populated in one or more data fields of the plurality of data fields;
    receiving a second user selection of a second recommendation icon displayed on the user interface for a different recommendation;
    in response to receiving the second user selection, immediately re-estimating the time to sell and sales price range and determining at least one second listing parameter that corresponds to the re-estimated time to sell and sales price range; and
    causing a dynamic update to the user interface to display the re-estimated time to sell and sales price range and to replace the at least one first listing parameter with the at least one second listing parameters.

2. The method of claim 1, wherein the first recommendation icon or the second recommendation icon is associated with a request for a recommendation to sell the item quickly and the other recommendation icon is associated with a request to get a highest price.

3. The method of claim 1, wherein the at least one first listing parameter is derived from a subject listing of a network marketplace, the method further comprising:
    generating, using a machine classifier, a set of listings having a similarity to the subject listing; and
    ranking the set of listings based on a time to sell of each listing of the set of listings,
    wherein the at least one first listing parameter is based on a highest ranked portion of the set of listings.

4. The method of claim 3, further comprising:
    second ranking the set of listings based on the re-estimated sales price range in response to the second user selection, wherein the at least one second listing parameter is based on a highest ranked portion of the second ranked set of listings.

5. The method of claim 3, wherein the machine classifier is trained based on a completed set of listings from a network-based publication system.

6. The method of claim 3, further comprising:
    querying a database of completed listings based on the first user selection or the second user selection;
    generating a second set of listings based on the querying; and
    providing the second set of listings to the machine classifier, wherein the machine classifier generates the first set of listings in response to being provided the second set of listings.

7. The method of claim 1, further comprising:
    receiving a user input changing at least one of the data fields;
    immediately performing a second re-estimating of the time to sell and sales price range in response to the user input; and
    causing a dynamic update to the user interface to display the second re-estimated time to sell and sales price range.

8. The method of claim 1, further comprising:
    generating and publishing a listing on a network-based publication system based on the data fields.

9. A system comprising:
    hardware processing circuitry; and
    a memory storing instructions that, when executed, configures the hardware processing circuitry to perform operations comprising:
        causing display of a user interface comprising a plurality of data fields in which listing parameters of an item can be populated, the listing parameters being used to generate an item listing;
        receiving, via the user interface, a first user selection of a first recommendation icon displayed on the user interface;
        in response to receiving the first user selection:
            estimating a time to sell and a sales price range based on one or more characteristics of the item;
            determining at least one first listing parameter that corresponds to the estimated time to sell and sales price range, the at least one first listing parameter including one or more of a listing duration, a scheduled start time, a starting price, or a shipping parameter; and causing a dynamic update to the user interface to display the estimated time to sell, the sales price range, and the at least one first listing parameter populated in one or more data fields of the plurality of data fields;

receiving a second user selection of a second recommendation icon displayed on the user interface for a different recommendation;

in response to receiving the second user selection, immediately re-estimating the time to sell and sales price range and determining at least one second listing configuration parameters that corresponds to the re-estimated time to sell and sales price range; and causing a dynamic update to the user interface to display the re-estimated time to sell and sales price range and to replace the at least one first listing parameter with the at least one second listing parameter.

10. The system of claim 9, wherein the first recommendation icon or the second recommendation icon is associated with a request for a recommendation to sell the item quickly and the other recommendation icon is associated with a request to get a highest price.

11. The system of claim 9, wherein the at least one first listing parameter is derived from a subject listing of a network marketplace, the operations further comprising:

generating, using a machine classifier, a set of listings having a similarity to the subject listing; and ranking the set of listings based on a time to sell of each listing of the set of listings, wherein the at least one first listing parameter is based on a highest ranked portion of the set of listings.

12. The system of claim 11, wherein the operations further comprise:

second ranking the set of listings based on the re-estimated sales price range in response to the second user selection, wherein the at least one second listing parameter is based on a highest ranked portion of the second ranked set of listings.

13. The system of claim 11, wherein the machine classifier is trained based on a completed set of listings from a network-based publication system.

14. The system of claim 11, wherein the operations further comprise:

querying a database of completed listings based on the first user selection or the second user selection;

generating a second set of listings based on the querying; and providing the second set of listings to the machine classifier, wherein the machine classifier generates the first set of listings in response to being provided the second set of listings.

15. The system of claim 9, wherein the operations further comprise:

receiving a user input changing at least one of the data fields;

immediately performing a second re-estimating of the time to sell and sales price range in response to the user input; and causing a dynamic update to the user interface to display the second re-estimated time to sell and sales price range.

16. A non-transitory computer-storage medium comprising instructions that when executed configure hardware processing circuitry to perform operations comprising:

causing display of a user interface comprising a plurality of data fields in which listing parameters of an item can be populated, the listing parameters being used to generate an item listing;

receiving, via the user interface, a first user selection of a first recommendation icon displayed on the user interface;

in response to receiving the first user selection:

estimating a time to sell and a sales price range based on one or more characteristics of the item;

determining at least one first listing parameter that corresponds to the estimated time to sell and sales price range, the at least one first listing parameter including one or more of a listing duration, a scheduled start time, a starting price, or a shipping parameter; and causing a dynamic update to the user interface to display the estimated time to sell, the sales price range, and the at least one first listing parameter populated in one or more data fields of the plurality of data fields;

receiving a second user selection of a second recommendation icon displayed on the user interface for a different recommendation;

in response to receiving the second user selection, immediately re-estimating the time to sell and sales price range and determining at least one second listing parameter that corresponds to the re-estimated time to sell and sales price range; and causing a dynamic update to the user interface to display the re-estimated time to sell and sales price range and to replace the at least one first listing configuration parameter with the at least one second listing configuration parameter.

* * * * *